May 22, 1951  H. F. ANDERSON  2,554,289

PISTON RING

Filed Dec. 20, 1948

INVENTOR.
Hugo F. Anderson
BY
Attorney

Patented May 22, 1951

2,554,289

UNITED STATES PATENT OFFICE 2,554,289

PISTON RING

Hugo F. Anderson, Hastings, Mich., assignor to Hastings Manufacturing Company, Hastings, Mich.

Application December 20, 1948, Serial No. 66,183

5 Claims. (Cl. 309—45)

This invention relates to improvements in piston rings.

The main objects of this invention are:

First, to provide a piston ring element so constructed and conformed as to facilitate high unit pressure against a cylinder wall, close seating to the cylinder wall upon initial operation when first installed, effectual sealing for increased piston pressure, improved lubrication at its bearing points with a cylinder wall and prolonged life.

Second, to provide a piston ring element of the above type which may be readily and cheaply produced.

Further objects relating to details and economies of my invention will appear from the description to follow:

A structure embodying the features of my invention is illustrated in the accompanying drawings wherein.

Figure 1:
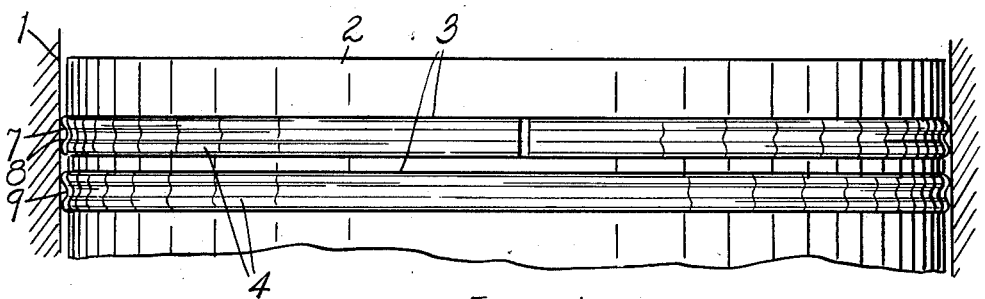
Fig. 1 is a fragmentary view of a piston, rings and cylinder in assembled relation, the piston and rings being shown in side elevation and the cylinder being shown in section.

In considering the accompanying drawings it should be borne in mind no attempt is made to illustrate clearances and manufacturing tolerances to scale as these are understood in the art and vary in accordance with engineering specifications. It will be further understood that no attempt is made to show the parts in relative proportions and dimensions.

Referring to the drawing 1 designates a cylinder and 2 a piston having ring grooves 3 therein for receiving the ring elements 4 and a ring expander element 5. Each of the ring elements 4 is of cast iron and of split annular shape and having inherent resilience to expansibly engage the cylinder wall 1. The expander spring 5 is of the split annular type such as is disclosed in Patent No. 2,404,862. This spring acts to force the ring element 4 with increased tension against the cylinder wall 1.

Figure 2:
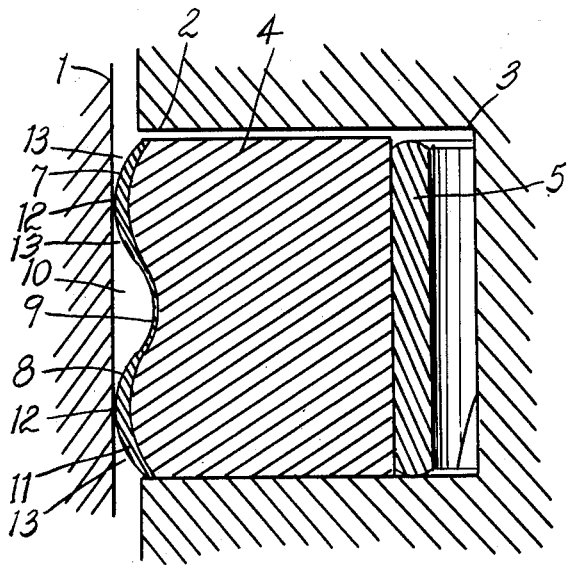
Figs. 2 is an enlarged fragmentary view showing in section the piston, ring, expander and cylinder in assembled relation.
Figure 3:
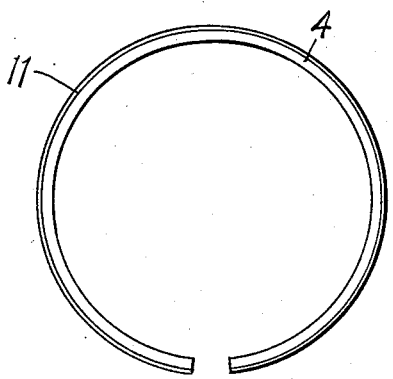
Fig. 3 is a plan view of the ring element.

Referring to Fig. 2, the cylinder wall engaging portion of the ring element 4 facing the cylinder wall is provided with an upper outwardly curved surface 7 and a lower outwardly curved surface 8, the outwardly curved surfaces 7 and 8 being connected by an intermediate inwardly curved surface 9, providing an annular depression or oil receiving pocket 10 intermediate said outwardly curved surfaces 7 and 8. The surfaces 7, 8 and 9 are chrome plated, this plating 11 being the thickest at the outermost parts of the outer surfaces 7 and 8, and thinnest at the inner most part of the inner surface 9. The curvature of the plating on the outermost parts is such as to provide a hair-line contact 12 of the plating with the cylinder wall 1. The radius of the arc of curvature of the cylinder wall engaging surface at and adjacent the opposite sides of said line is preferably not greater than approximately .045 of an inch. This provides a relatively very narrow hair-line of contact and provides relatively large pockets 13 for oil very close to the opposite sides of the said line of contact. This hair-line contact 12 and the relatively large oil pockets 13 close to the hair-line contact thus provided, facilitates a relatively high unit of pressure of the ring element against the cylinder wall for close seating of the ring element to the cylinder wall during initial operation when the ring element is first installed, effectual sealing between the ring element and cylinder wall for maximum piston pressure, and effectual oil control and lubrication close the hairline contact for long life of the ring element.

The curved cap of chromium 11 having the hair line contact 12 with the cylinder wall, above described, overcomes seating problems, for the hair-line contact does not require normal seating and will control oil and seal pressure almost instantly when first installed. Because of the extreme hardness of chromium the line of contact 12 wears very slowly and stays narrow throughout the life of the ring element. The radius of the arc of curvature above described permits a substantial quantity of oil to stay very close to the frictional or contacting line 12 of the ring against the cylinder wall. Another feature of this hair-line contact of chromium against the cylinder wall is its remarkable freedom from frictional drag. Rings so made having high tension against a cylinder wall, even when used in connection with an expander spring to produce increased tension such as that shown at 5 in Fig. 2, produce no noticeable excess friction and the initial starting characteristics of such rings are remarkably free from drag so that the starter will spin the engine on the first start and no drag or resulting high temperatures from friction are found in the engine, even during the first few miles of operation.

The construction has the advantages above described without the necessity of resorting to porosity produced by any method such as partially deplating a chrome plated surface or by using a rough surface so as to deposit the chrome in a rough manner, or by using any kind of etching to produce a rough surface on the chrome, as heretofore used. All of these roughened up surfaces are objectionable and while they temporarily help seating in the long run they are not desirable for as they wear off, the chromium becomes flatter, the contact wider and the tendency to seal less. Also the method of partially deplating a chrome plated surface has a further objection in that there is debris or waste material rubbed off, produced by the deplating. This debris has an abrasive-like action and gets between the ring and the walls of the groove. My construction above described eliminates the necessity for any other means of producing quick seating. A feature of the chrome is that it will maintain this narrow contact, because of its extreme resistance to wear until the ring is thoroughly seated and in fact throughout the major life of the ring.

The expander 5 provides increased tension of the ring element 4 against the cylinder wall 1 at the hair-line contacts 12, and the annular depression or cavity 10 between the spaced hair-line contacts 12 provides a pocket of substantial capacity for the reception of oil to facilitate increased lubrication.

I have illustrated and described a very practical embodiment of my invention. I have not attempted to illustrate or describe other embodiments or adaptations as it is believed this disclosure will enable those skilled in the art to embody or adapt my invention as may desire.

Having thus described my invention what I claim as new and desire to secure by Letters Patent is:

1. A piston ring assembly comprising an annular split expansible ring member and an expander spring acting against a cylinder wall, said ring member having a chrome plated cylinder wall engaging surface, said surface and the surface supporting the chromium plating being outwardly curved adjacent the top of the ring member and outwardly curved adjacent the bottom of the ring member and inwardly curved intermediate the outwardly curved portions, the outwardly curved portions of the chromium surface providing a pair of axially spaced hair-line contacts of the ring member with a cylinder wall for engaging the same around the circumference thereof, the chromium surface on both sides of each hair-line contact sloping radially inwardly from said line, and the supporting surface for the chromium on both sides of a line inwardly of said hair-line also sloping radially inwardly, the inwardly curved portion of said surface providing an annular oil receiving pocket intermediate the outwardly curved portions of said surface.

2. A piston ring comprising an annular split expansible ring member having a chrome plated cylinder wall engaging surface, said surface and the surface supporting the chromium plating being outwardly curved adjacent the top of the ring member and outwardly curved adjacent the bottom of the ring member and inwardly curved intermediate the outwardly curved portions, the outwardly curved portions of the chromium surface providing a pair of axially spaced hair-line contacts of the ring member with a cylinder wall for engaging the same around the circumference thereof, the chromium surface on both sides of each hair-line contact sloping radially inwardly from said line, and the supporting surface for the chromium on both sides of a line inwardly of said hair-line also sloping radially inwardly, the inwardly curved portion of said surface providing an annular oil receiving pocket intermediate the outwardly curved portions of said surface.

3. A piston ring comprising an annular split expansible ring member having a chrome plated cylinder wall engaging surface, said surface and the surface supporting the chromium plating having axially spaced outwardly projecting portions extending around the circumference of the ring member and an inwardly curved portion intermediate said outwardly curved portions, the outwardly curved portions of the chromium surface providing a pair of axially spaced hair-line contacts of the ring member with a cylinder wall, the chromium surface on both sides of each hair-line contact sloping radially inwardly from said line, and the supporting surface for the chromium on both sides of a line inwardly of said hair-line also sloping radially inwardly, the inwardly curved portion of said surface providing an annular oil receiving pocket intermediate said spaced hair-line contacts.

4. A piston ring comprising an annular split expansible integral ring member having cylinder wall engaging surface, said surface having axially spaced outwardly projecting chrome plated portions extending around the outer circumference of the ring member, and a depressed portion intermediate the outwardly projecting chrome plated portions, the outwardly projecting chrome plated portions of said surface providing axially spaced hair-line contacts of the ring member with a cylinder wall, the depressed portion of said surface providing an annular oil receiving pocket intermediate said spaced hair-line contacts.

5. A piston ring comprising an annular split expansible integral ring member having a cylinder wall engaging surface, said surface having axially spaced outwardly projecting portions and a depressed portion intermediate said outwardly projecting portions, said outwardly projecting portions of said surface being chrome plated and providing axially spaced hair-line contacts with a cylinder wall, the chromium surface on both sides of each hair-line contact sloping radially inwardly from said line, and the supporting surface for the chromium on both sides of a line inwardly of said hair-line also sloping radially inwardly, said depressed portion providing an annular oil receiving pocket between said outwardly projecting portions.

HUGO F. ANDERSON.

REFERENCES CITED

The following references are of record in the file of this patent:

UNITED STATES PATENTS

| Number | Name | Date |
|---|---|---|
| 2,303,798 | Solenberger | Dec. 1, 1942 |
| 2,367,159 | Van Der Horst | Jan. 9, 1945 |
| 2,436,227 | Phillips | Feb. 17, 1948 |

FOREIGN PATENTS

| Number | Country | Date |
|---|---|---|
| 721,633 | France | Dec. 22, 1931 |